US010934996B2

(12) United States Patent
Kjær et al.

(10) Patent No.: US 10,934,996 B2
(45) Date of Patent: Mar. 2, 2021

(54) BOOST AND REGULATION GROUPS FOR WIND POWER PLANT

(71) Applicant: VESTAS WIND SYSTEMS A/S, Aarhus N (DK)

(72) Inventors: Martin Ansbjerg Kjær, Harlev J (DK); Jorge Martinez Garcia, Bormujos (ES); Eik Herbsleb, Odder (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 135 days.

(21) Appl. No.: 15/759,781

(22) PCT Filed: Sep. 8, 2016

(86) PCT No.: PCT/DK2016/050295
§ 371 (c)(1),
(2) Date: Mar. 13, 2018

(87) PCT Pub. No.: WO2017/054822
PCT Pub. Date: Apr. 6, 2017

(65) Prior Publication Data
US 2019/0048852 A1      Feb. 14, 2019

(30) Foreign Application Priority Data

Sep. 29, 2015  (DK) .......................... PA2015 70616

(51) Int. Cl.
*G05B 13/02*     (2006.01)
*F03D 7/02*      (2006.01)
(Continued)

(52) U.S. Cl.
CPC .......... *F03D 7/0284* (2013.01); *F03D 7/046* (2013.01); *F03D 7/047* (2013.01); *F03D 7/048* (2013.01);
(Continued)

(58) Field of Classification Search
CPC ........ F03D 7/0284; F03D 7/047; F03D 7/046; F03D 7/048; H02J 3/386; Y02E 10/723;
(Continued)

(56) References Cited

U.S. PATENT DOCUMENTS 8,095,244 B2    1/2012  Morjaria et al.
8,853,877 B1 *  10/2014 Zalar ...................... F03D 7/048
                                              290/44
(Continued)

FOREIGN PATENT DOCUMENTS

CN    101876289 A   11/2010
EP      2416007 A2   2/2012
(Continued)

OTHER PUBLICATIONS

Danish Patent and Trademark Office Search Report for Application No. PA 2015 70616 dated May 13, 2016.
(Continued)

*Primary Examiner* — Kenneth M Lo
*Assistant Examiner* — Mohammed Shafayet
(74) *Attorney, Agent, or Firm* — Patterson + Sheridan, LLP (57) ABSTRACT

A method, control arrangement, and wind power plant (WPP) comprising a plurality of wind turbine generators (WTGs) are disclosed. The method includes operating, responsive to a received power demand corresponding to the WPP, a boost group of one or more WTGs of the plurality of WTGs to begin producing a boosted power output, wherein the boosted power output of each of the one or more WTGs of the boost group is regulated independent of the power demand. The method further includes determining, based on a measured amount of boosted power production,
(Continued)

power production set points for a regulation group of one or more different WTGs of the plurality of WTGs to thereby meet the power demand.

24 Claims, 7 Drawing Sheets (51) Int. Cl.
F03D 7/04 (2006.01)
H02J 3/38 (2006.01)

(52) U.S. Cl.
CPC .......... *G05B 13/0265* (2013.01); *H02J 3/386* (2013.01); *F05B 2270/1033* (2013.01); *F05B 2270/10711* (2013.01); *F05B 2270/337* (2013.01); *Y02E 10/72* (2013.01)

(58) Field of Classification Search
CPC ...... F05B 2270/337; F05B 2270/10711; F05B 2270/1033; G05B 13/0265
USPC ........................................................ 700/287
See application file for complete search history.

(56) References Cited

U.S. PATENT DOCUMENTS

| | | | | | |
|---|---|---|---|---|---|
| 2006/0273595 | A1* | 12/2006 | Avagliano | ............... | F03D 7/028 290/44 |
| 2008/0088129 | A1* | 4/2008 | Altemark | ............... | F03D 7/043 290/44 |
| 2010/0025994 | A1* | 2/2010 | Cardinal | ............... | F03D 7/0284 290/44 |
| 2010/0332042 | A1* | 12/2010 | Riesberg | ............... | F03D 7/0284 700/287 |
| 2011/0118884 | A1* | 5/2011 | Mayor | ................. | F03D 7/0284 700/287 |
| 2011/0140428 | A1* | 6/2011 | Wakata | ................. | F03D 7/0284 290/44 |
| 2011/0142619 | A1* | 6/2011 | Subramanian | .......... | F03D 7/048 416/1 |
| 2011/0144816 | A1* | 6/2011 | Morjaria | ................. | F03D 7/048 700/287 |
| 2011/0166717 | A1* | 7/2011 | Yasugi | ................. | F03D 7/0284 700/287 |
| 2012/0248772 | A1* | 10/2012 | Shigemizu | ............... | H02P 9/04 290/44 |
| 2012/0256422 | A1* | 10/2012 | Fradella | ............... | H02K 1/2793 290/55 |
| 2014/0001763 | A1* | 1/2014 | Kragelund | ................ | H02P 9/04 290/55 |
| 2014/0103653 | A1* | 4/2014 | Ubben | .................... | F03D 7/028 290/44 |
| 2015/0159626 | A1* | 6/2015 | Tarnowski | ............. | F03D 7/028 290/44 |
| 2016/0177923 | A1* | 6/2016 | Edenfeld | .................. | F03D 9/25 290/44 |

FOREIGN PATENT DOCUMENTS

| | | | |
|---|---|---|---|
| EP | 2532888 | A1 | 12/2012 |
| EP | 2634422 | A1 | 9/2013 |
| EP | 2532888 | B1 | 5/2014 |
| EP | 2921699 | A1 | 9/2015 |
| WO | 2012041326 | A2 | 4/2012 |
| WO | WO-2013167141 | A1 * | 11/2013 |
| WO | WO-2014053136 | A1 * | 4/2014 ........... F03D 7/0224 |
| WO | 2015120856 | A1 | 8/2015 |
| WO | 2017054822 | A1 | 4/2017 |

OTHER PUBLICATIONS

PCT Notification of Transmittal of the International Search Report and the Written Opinion of the International Searching Authority, or the Declaration for Application No. PCT/DK2016/050295 dated Nov. 18, 2016.

Chinese Office Action for Application No. 201680056991.2 dated Apr. 4, 2019.

Intellectual Property India, First Examination Report for application 201817013653, dated Aug. 28, 2020.

* cited by examiner

BOOST AND REGULATION GROUPS FOR WIND POWER PLANT

BACKGROUND

Field of the Invention

Embodiments presented in this disclosure generally relate to power generation using boost and regulation groups of wind turbine generators.

Description of the Related Art

Modern power generation and distribution networks increasingly rely on renewable energy sources, such as wind turbine generators. In some cases, the wind turbine generators may be substituted for conventional, fossil fuel-based generators. Beyond merely generating and delivering electrical power, the wind turbine generators are responsible for contributing to grid stability through frequency regulation. However, natural variations in wind conditions can affect the ability of wind turbines to predictably deliver power and regulate grid frequency. Additionally, wind conditions at times may be unsuitable for generating power.

SUMMARY

One embodiment of the present disclosure is a method, a control arrangement, and a wind power plant (WPP) comprising a plurality of wind turbine generators (WTGs). The method includes operating, responsive to a received power demand corresponding to the WPP, a boost group of one or more WTGs of the plurality of WTGs to begin producing a boosted power output. The method further includes determining, based on a measured amount of boosted power production, power production set points for a regulation group of one or more different WTGs of the plurality of WTGs to thereby meet the power demand.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Wind turbine generators (WTGs) of a wind power plant (WPP) may at times produce active power in amounts larger than the power available through the wind, "boosting" the power level using the kinetic energy stored in the rotor during operation. Because the grid frequency may change somewhat unpredictably during a frequency event, it is beneficial to provide an adaptive and responsive power output (including a boosted power output) for grid stabilization purposes. While it is possible to configure the WTG control system to provide a tight regulation of boost power production, this regulation capability adds significant and sometimes unwanted complexity to the control system. Additionally, managing the structural loads on components of the WTGs during boosting may impose operational constraints that are prohibitively expensive to design around, making the tight regulation of boost power production unsuitable or undesired.

Embodiments of the disclosure are generally directed to a control arrangement and associated method of controlling a power output of a wind power plant. The method includes operating a boost group of one or more WTGs to begin producing a boosted power output, and determining, based on the amount of boost power production from the boost group, power production set points for a regulation group of one or more other WTGs to meet a power demand for the WPP.

In some embodiments, the boosted power output is regulated independent of any changes to the power demand during a boosting event, e.g., during a grid disturbance. In some cases, WTGs of the boost group are operated without a substantially continuous control of the boost power output. As discussed herein, "without substantially continuous control" refers to controlling the boost power output with a lesser time resolution (e.g., updating less frequently) than that of the corresponding wind-based power output of the WTGs. For example, instead of providing and updating boost power set points for the WTG periodically during a boosting event, and adjusting the boost power output based on the set points, the boost group in some cases provides a "one-shot" boosting, in which WTGs provide a predetermined level of boost power in response to an instruction to begin boosting. One-shot boosting can be beneficial to obtain the most boost power possible from the boost group, and for the relatively simplicity of the control system. In some embodiments, the predetermined level of boost power corresponds to full boosting capabilities of the WTGs. In other embodiments, the predetermined level of boost power is based on the properties of the demand signal (amplitude, length, etc.).

In another example, during a boosting event the boost power output control is periodically updated with a frequency that is less than the update frequency of the wind-based power output control. For example, during a boosting event the wind-based power set points may be updated with a frequency that is twice the update frequency of the boost power set points (a 2:1 ratio). Other suitable rational or non-rational numbers are possible, such as 3:1, 3:2, 4:1, 4:3, 5:1, 10:1, etc.

As boost capabilities may vary between WTGs and based on current operational conditions, the collective boost power output from the wind power plant may be somewhat uncontrolled. The one or more other WTGs included in the regulation group are operated in a manner to mitigate some of the effects of boost power production by the boost group WTGs. In some embodiments, the WTGs of the regulation group are operated with a curtailed power output, which provides additional regulation headroom for mitigating effects of boost power production. The boost group WTGs form a relatively slow, outer control loop for the wind power plant while the regulation group WTGs form a relatively fast, inner control loop that is responsive to the outer control loop.

In some embodiments, the control arrangement can instruct the WTGs to halt the boost power output during a boost event. Halting the boost power may be performed responsive to determining that boost power is no longer needed, e.g., caused by changes in the grid condition, improved wind conditions providing greater wind power production capability, etc. Halting the boost power output before the boost capability of each WTG is fully expended offers the advantage of a shorter recovery period to resume normal operation and restore boost capability of the WTGs.

In some embodiments, a boost quality of the WTGs is assessed and the number of WTGs to include in the regulation group is determined based on the relative boost quality. In some embodiments, the particular WTGs of the WPP may be selected for the boost group and/or the regulation group based on the corresponding boost quality. Boost quality may be assessed based on simulated or actual operation boost production data for the WTGs.

Figure 1:
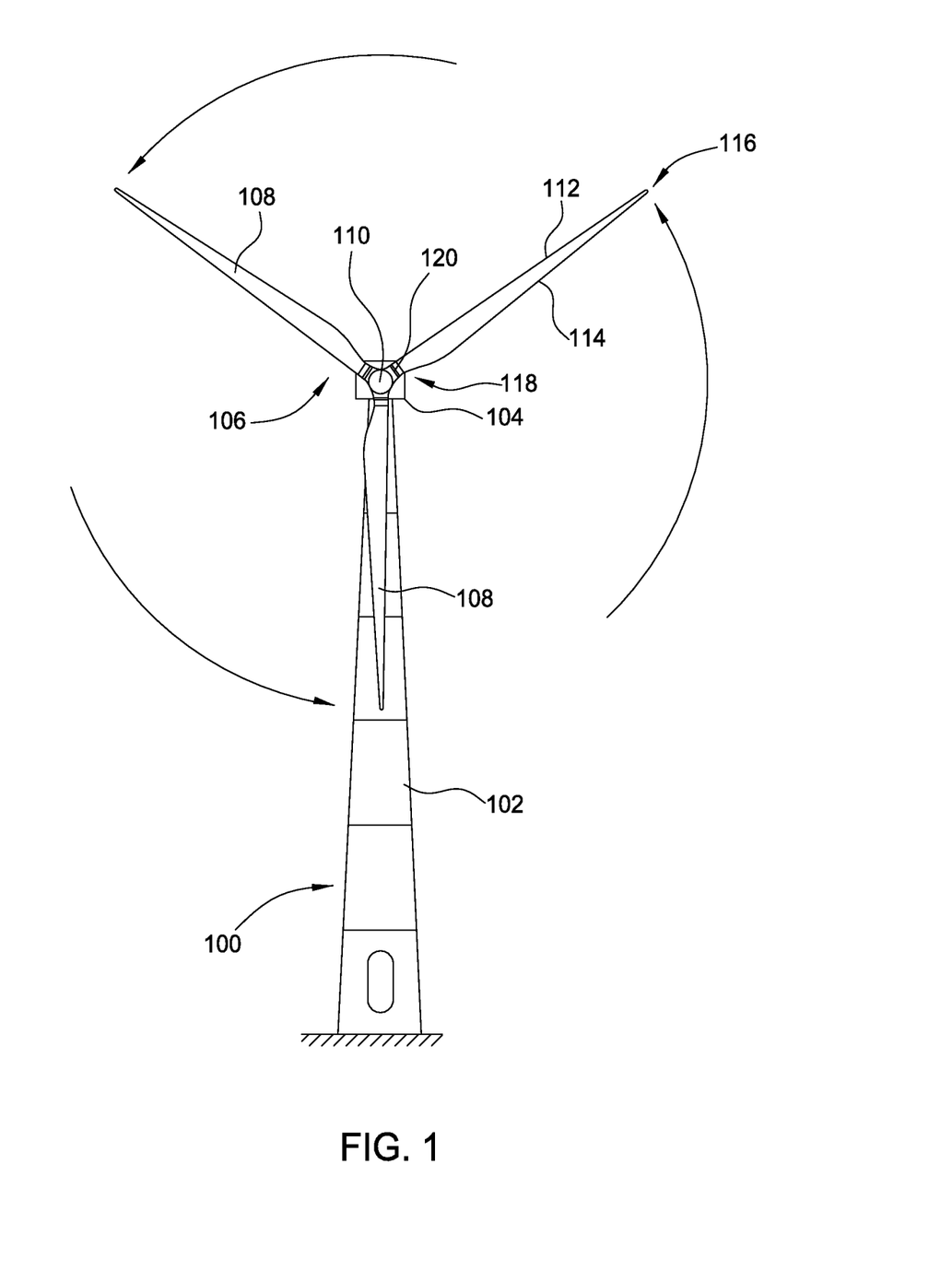
FIG. 1 illustrates a diagrammatic view of a horizontal-axis wind turbine, according to one embodiment.

FIG. 1 illustrates a diagrammatic view of a horizontal-axis wind turbine 100. The wind turbine 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108. Blade pitch control may also be used among other systems to maximize the power generated below rated wind speeds and to reduce the power generated above the rated wind speed to prevent excessive loading on turbine components, e.g., the generator and gearbox. Although the following embodiments are described in the context of wind turbine generators, the embodiments are not limited to such. Indeed, this disclosure may apply to any power generation system capable of providing temporary boosts to power output using the kinetic energy of components such as generator rotors.

Figure 2:
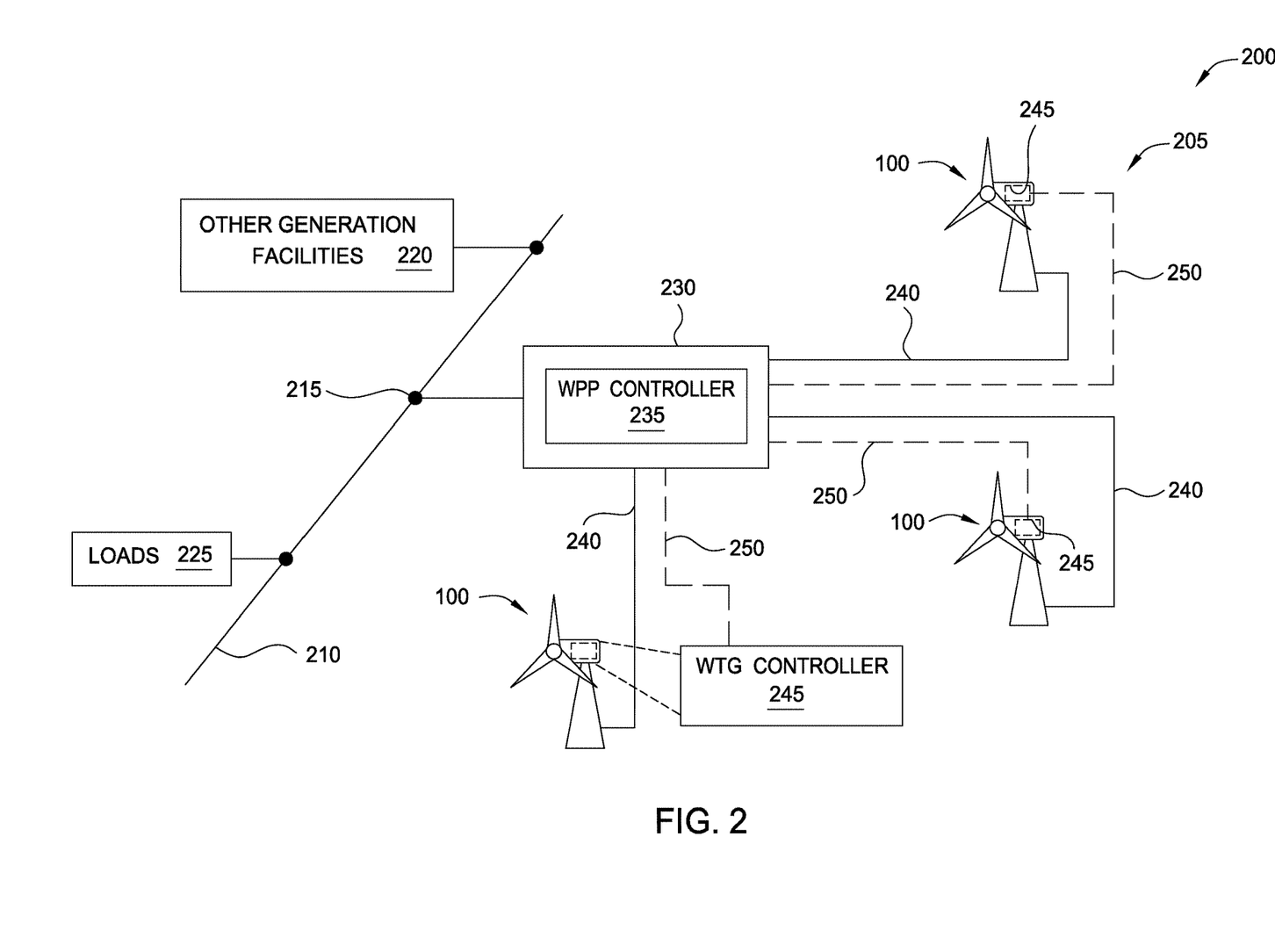
FIG. 2 illustrates a wind power plant operatively connected with an electrical grid, according to one embodiment.

FIG. 2 illustrates a wind power plant operatively connected with an electrical grid, according to one embodiment. In the depicted arrangement 200, a wind power plant 205 includes a plurality of wind turbines 100 operatively connected with an electrical grid 210 at a point of common coupling (or PCC) 215. In some embodiments, the wind turbines 100 of the wind power plant 205 are coupled with a substation 230 that includes a wind power plant controller 235. In this case, the output from the substation 230 is coupled with electrical grid 210, and the electrical power generated by the wind turbines 100 is carried on one or more connections 240 to the substation 230. In an alternate embodiment, the wind power plant controller is located at an alternate location within the arrangement 200, such as with one of the wind turbines 100. In an alternate embodiment, one or more wind turbines 100 may deliver electrical power directly to the electrical grid 210 without being grouped and/or directed through the substation 230. The wind power plant controller 235 is communicatively coupled with each of the wind turbines 100 (e.g., with a respective wind turbine-level controller 245) through one or more connections 250.

The electrical grid 210 represents any suitable electrical transmission and/or distribution grids, which may be operated at one or more voltages. The electrical grid 210 generally includes a number of transmission lines, transformers, substations, etc. The electrical grid 210 may be connected with one or more other generation facilities 220, such as one or more additional wind power plants, and/or one or more different types of generation facilities, such as fossil fuel-based, geothermal, solar, hydroelectric, nuclear, and so forth. The electrical grid 210 is also connected with one or more loads 225, which generally represent industrial, commercial, and/or residential electricity consumers.

Generally, differences in the amount of electrical power generated (e.g., produced by the wind power plant 205 and by the other generation facilities 220) and the amount of electrical power demanded by loads (e.g., loads 225) on an electrical grid cause the grid frequency to deviate from its prescribed or nominal value. Typical values of nominal grid frequency are 60 hertz (Hz) in the US and 50 Hz in Europe. One example of grid frequency deviation occurs when power demand exceeds the power generated—the difference in power can be drawn from the kinetic energy of the wind turbine generator, causing the wind turbine rotor (e.g., rotor 106 of FIG. 1) to slow down and the grid frequency to decrease accordingly. Conversely, when power generation exceeds the amount of power demand, the grid frequency may increase. In some cases, the wind turbine generators may be configured to operate within a predetermined frequency range, such as ±1% of the nominal grid frequency, before disconnecting or performing other regulation procedures to restore the grid frequency to within the predetermined frequency range.

Each wind turbine 100 includes a wind turbine generator (not shown) configured to convert the mechanical energy of the wind turbine rotor 106 into one or more phases of electrical power, which is ultimately delivered to the electrical grid 210 and the loads 225 connected thereto. In various embodiments, the wind turbine generators produce electrical power based on control signals provided by the wind power plant controller 235 and/or wind turbine generator controllers 245. The wind turbine generators may also provide feedback signals and other information to the wind power plant controller 235 using the connections 240, 250.

Figure 3:
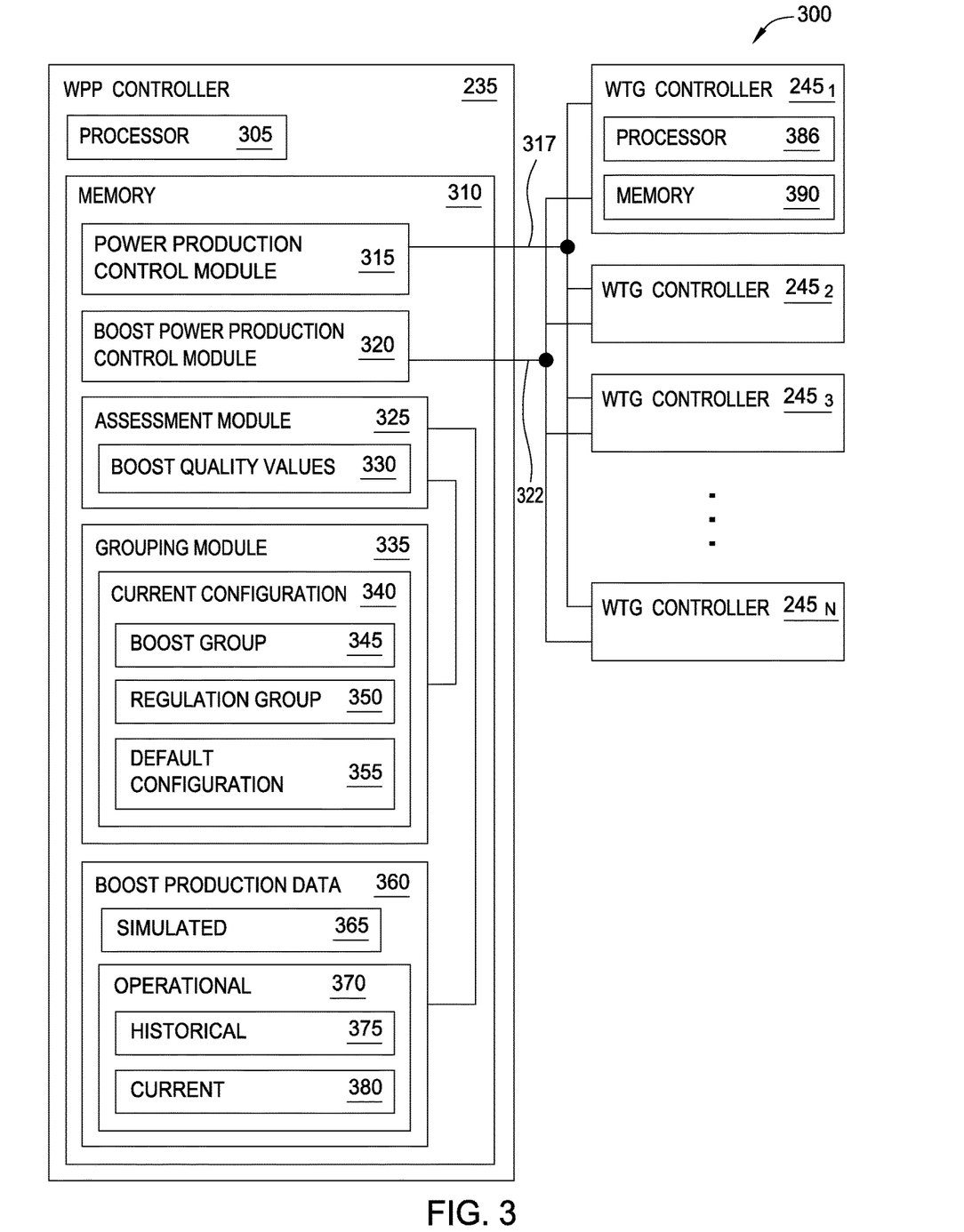
FIG. 3 is a block diagram illustrating a control arrangement for a wind power plant comprising a plurality of wind turbine generators, according to one embodiment.

FIG. 3 is a block diagram illustrating a control arrangement for a wind power plant comprising a plurality of wind turbine generators, according to one embodiment. The control arrangement 300 is generally disposed at the wind power plant 205 (FIG. 2), and may be distributed among one or more wind turbines and/or a substation. The wind power plant (WPP) controller 235 is communicatively coupled with a plurality of wind turbine generator (WTG) controllers $245_{1-N}$. Each of the WTG controllers $245_{1-N}$ (generically or collectively, "controller(s) 245") is coupled with one or more corresponding wind turbine generators that are configured to supply electrical power to an associated electrical grid. While the control arrangement 300 is depicted as having a distributed control implementation, an alternative implementation may consolidate all of the functionality of the control arrangement 300 into a single controller.

The WPP controller 235 includes a processor 305 and memory 310. Each of the WTG controllers 245 may include a processor 385 and memory 390. The processors 305, 385 may have any suitable form, such as a general purpose microprocessor, a controller, an application-specific integrated circuit (ASIC), and so forth. In some embodiments, the processors 305, 385 comprises parts of (or all of) one or more integrated circuits (ICs) and/or other circuitry components. In some embodiments, the processors 305, 385 also comprise electronically-readable instructions, such as firmware code, software code, and the like. In some embodiments, components comprising the processor 305 or 385 are located together, such as being included in a common printed circuit board. Processors 305, 385 are further coupled with the respective memories 310, 390. Memories 310, 390 may include a variety of computer-readable media selected for their size, relative performance, or other capabilities: volatile and/or non-volatile media, removable and/or non-removable media, etc. Memories 310, 390 may include registers, cache, random access memory (RAM), storage, etc. Storage included as part of memories 310, 390 may typically provide a non-volatile memory for the processors 305, 385, and may include one or more different storage elements such as Flash memory, a hard disk drive, a solid state drive, an optical storage device, and/or a magnetic storage device.

Although not explicitly shown, the processors 305, 385 and memories 310, 390 are further coupled with input/output (I/O) circuitry, which may include a number of different I/O adapters including circuitry that supports communication to and from the controllers 235, 245. One non-limiting example of I/O circuitry includes network interface cards (NICs) for communicating through the connections 250 (FIG. 2). Other I/O adapters included in the control arrangement 300 may generally support an end-user's interface with the controllers 235, 245. For example, the I/O circuitry may include connections for visual/audio/other sensory output devices, as well as connections for input devices such as a keyboard, mouse, touchscreen, etc. In one embodiment, I/O circuitry may include graphics cards that include separate processing elements and/or memory.

The controllers 235, 245 may include one or more modules that provide a particular functionality within the control arrangement 300. The modules may be embodied in hardware or firmware (e.g., included in or coupled with processors 305, 385), as software stored in memories 310, 390, or combinations thereof. Furthermore, the modules may be implemented solely within one of the controllers 235, 245 and/or distributed across different controllers. Although modules are depicted as being included within a particular controller of the controllers 235, 245, in other embodiments one or more modules may be included in other controller(s).

The wind power plant controller 235 includes a power production control module 315 (or "power production module," "power module"), a boost power production control module 320 (or "boost power production module," "boost module"), an assessment module 325, and a grouping module 335.

The power module 315 operates to generate set points 317 or other suitable demand signals for controlling the power produced by each of the WTGs in the WPP. The set points 317 correspond to available power production for the WTGs based on current wind conditions. The power module 315 generates the set points 317 based on a received or generated WPP-level power demand signal, such as a WPP power output set point, according to any suitable techniques.

The boost module 320 operates to control boost power production from each of the WTGs. As referred to herein, "boost power" production refers to power production by the WTGs using the kinetic energy (or inertia) available in the rotors of the WTGs during their operation. The boost module 320 controls boost power production of the WTGs based on the power demand signal at the WPP level. For example, the WPP controller 235 may determine that producing the amount of power indicated by the WPP power demand signal requires an amount of boost power beyond available power in the wind.

In some embodiments, the boost module 320 transmits instruction signals 322 to certain ones of the WTG controllers 245 to begin producing boost power. In some embodiments, some or all of the WTG controllers 245 are configured to regulate the boost power production of the corresponding WTG independent of a power demand signal. In some embodiments, the WTG controllers 245 produce boost power without tracking a boost power reference signal. For example, the instruction signals 322 might not include boost power reference values. In another example, the instruction signals 322 could indicate that the WTG controller 245 should begin producing boost power at a predetermined level or rate, such as at a maximum rate, or some other level or rate known to the WTG controller 245 (e.g., according to value(s) stored in memory 390).

In other embodiments, a boost power reference signal is provided to the WTG controllers 245 but values of the reference signal are updated relatively slowly. In such a case, the WTG controller 245 may be unable to substantially continuously track the boost power reference signal, as the boost characteristics of the WTG includes power production variations that occur more quickly (e.g., with a greater time resolution) than the boost power reference values are updated.

While it may be possible to control the boost power production based on (and responsive to) the power demand signal, such a feature introduces a significant amount of complexity to the control arrangement 300. Due to the additional stresses on the WTG caused by providing a boosted power output, suitable operational margins can be significantly limited during boost power production. For example, when rotor speed decreases and power increases, the corresponding torque values may increase and reach predetermined torque limits. Thus, the power output level could be limited from its full boosting potential due to structural considerations. Thus, the process of developing operational parameters that are suitable for desired power production and managing the wind turbine structural loads, all while losing one of the control parameters may be prohibitively costly, or it may be entirely infeasible.

The grouping module 335 operates to determine a boost group 345 and regulation group 350 of the WTGs of the WPP. In some embodiments, each WTG included in the WPP is assigned or designated by the grouping module 335 to one of the boost group 345 and the regulation group 350. In other embodiments, at least one of the WTGs of the WPP is not included in either the boost group 345 and the regulation group 350. The grouping module 335 determines a current configuration 340 (or composition) of the WPP, which may be updated periodically or responsive to certain events or triggers. The grouping module 335 may also include a default configuration 355 that is applied to the WPP under certain conditions. Generally, by operating the WTGs within separate boost group 345 and regulation group 350, a greater power output range of the WPP can be dynamically controlled.

The groupings (boost group 345 and regulation group 350) may be determined based on boost production data 360 included in the memory 310. The boost production data 360 reflects a realistic, time-based boost power production profile for the WTGs, including variations in the boost signal. The boost production data 360 may be simulated boost production data 365 for a WTG with a particular configuration, or may reflect operational boost production data 370 reflecting production of the particular WTG acquired through measurements. The operational data 370 may include historical data 375 relating to one or more previous boost events using the WTG, and/or current data 380 relating to performance during a current boost event.

In some embodiments, the assessment module 325 processes the boost production data 360 for various WTGs to calculate corresponding boost quality values 330. The boost quality values 330 may be calculated based on any number of different criteria that reflect the ability of a particular WTG to provide a desired boost power response. The boost quality values 330 may be determined based on a boost power reference signal, and may include criteria such as an amplitude of overshoot/undershoot of a reference signal level, a difference signal based on a comparison with the reference signal, a slope value for increase or decrease, etc. Each WTG may correspond to one or more boost quality values 330, for example, a respective value for each calculated aspect. In another example, a single boost quality value 330 is calculated for each WTG based on a sum (or weighted sum) reflecting some or all of the calculated aspects.

The boost quality values 330 are used by the grouping module 335 to determine the configuration (or composition) of boost group 345 and regulation group 350. In some embodiments, the boost quality values 330 of some or all of the WTGs may be used to calculate a number of WTGs to include in the regulation group 350. Generally, including fewer WTGs in the regulation group 350 allows for the wind power plant to have a greater boosting power capability, as more WTGs are included in the boost group 345. It may be beneficial, therefore, to determine a minimum number of WTGs to include in the regulation group 350. However, if the boost quality of the WTGs is sufficiently low (as determined by the respective boost quality values 330), an additional regulation capability may be necessary to mitigate the poor boosting quality and ensure that the overall WPP power demand is met. Determining an insufficient boosting quality may be based on, e.g., an average of the boost quality values 330 of all the WTGs, an average of the boost quality values 330 of a predetermined number of WTGs having the relative highest boost quality values 330, whether a predetermined number of WTGs meets a threshold boost quality value, or any other suitable measure.

In some embodiments, the particular WTGs that are included in the boost group 345 are selected based on the relative boost quality values 330, when compared with other WTGs of the WPP. For example, say the grouping module 335 determines that three WTGs (of ten WTGs included in the WPP) will be included in the regulation group 350, based collectively on the boost quality values 330 of all ten WTGs. The grouping module 335 may then select the seven WTGs having the highest boost quality values 330 for the boost group 345, leaving the three WTGs with the lowest boost quality values 330 to the regulation group 350. In other embodiments, selection of the WTGs for the boost group 345 and/or regulation group 350 may be according to any suitable technique, such as at random, based on location within the WPP and/or measured wind conditions, and so forth.

In some embodiments, the composition of boost group 345 and regulation group 350 may be updated based on an analysis of boost production data 360 for the boost group 245. More specifically, the current boost production data 380 (i.e., reflecting the actual boost performance of the boost group during the current boost event) may be collected and analyzed to determine whether the regulation group 350 provides sufficient regulation to meet the power demand and/or excessive regulation. Alternatively, measured power production from the WPP or set point data for the regulation group 350 may be analyzed to determine whether the regulation group 350 provides sufficient and/or excessive regulation. As discussed above, it may generally be beneficial to minimize the number of WTGs in the regulation group 350 to provide an increased boost capability for the WPP. Altering the composition of the boost group 345 and regulation group 350 generally includes transitioning one or more WTGs of the WPP to or from the boost group 345 or regulation group 350.

Updating or altering the composition of the boost group 345 and the regulation group 350 may be periodic and/or event-driven. For example, the grouping module 335 could update the composition of the groups each time it is determined that boost production will be required to meet a power demand for the wind power plant. In another example, the grouping module 335 periodically analyzes the measured power production using a particular composition, comparing the measured power production with historical production data from alternate composition(s). In this way, the grouping module 335 may update the groups' composition based on the "whole" power production of the WPP in addition to (or as an alternative to) analysis of boost power production.

Figure 4:
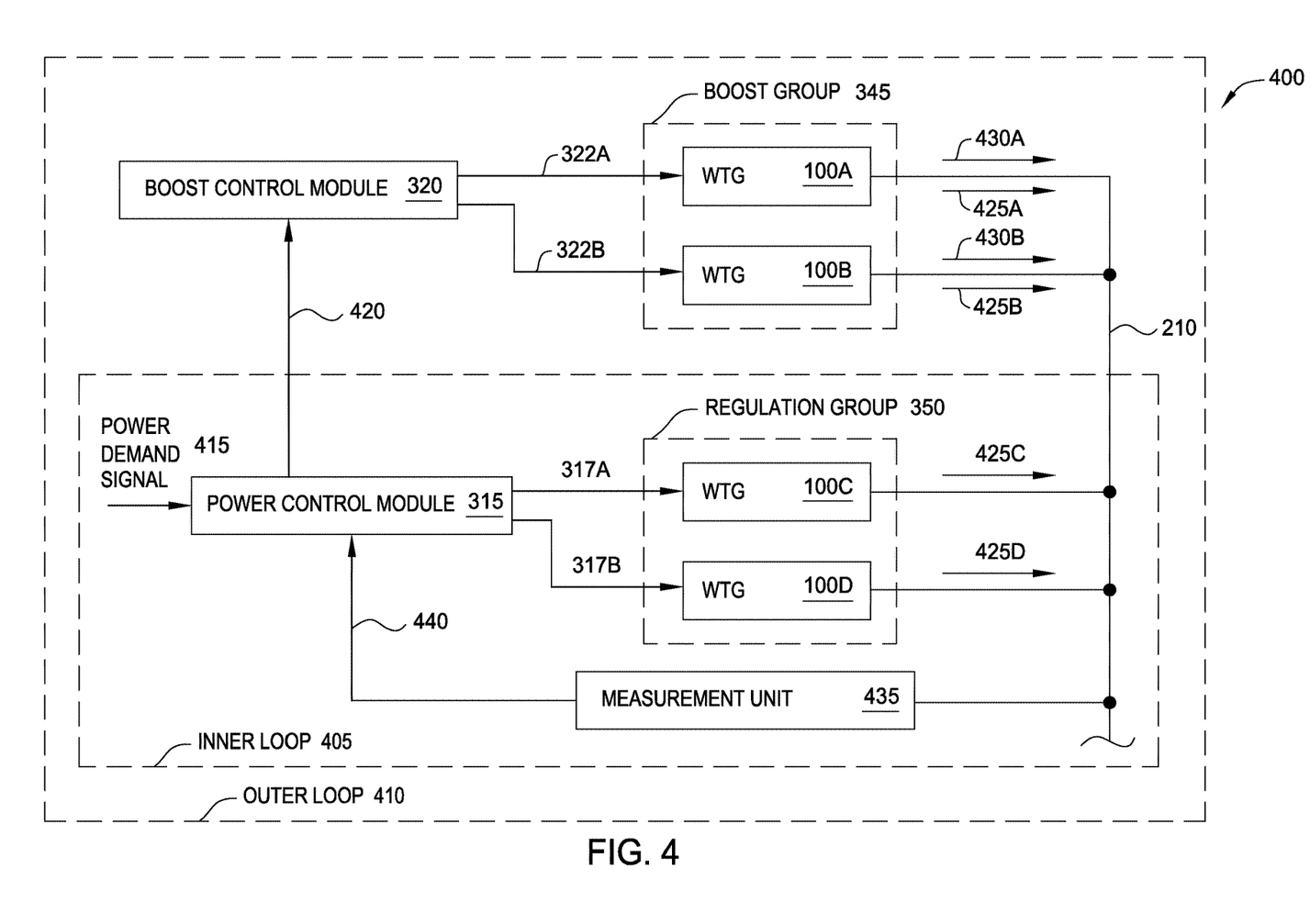
FIG. 4 is a block diagram illustrating exemplary operation of a control arrangement for a wind power plant comprising a plurality of wind turbine generators, according to one embodiment.

FIG. 4 is a block diagram illustrating exemplary operation of a control arrangement for a wind power plant comprising a plurality of wind turbine generators, according to one embodiment. Generally, arrangement 400 represents one possible configuration of the control arrangement 300 with a wind power plant 205.

As shown, the WPP includes four WTGs 100A, 1006, 100C, 100D. The power control module 315 receives a power demand signal 415. The power demand signal 415 may be received from an external source, such as by a controller outside of the wind power plant that is also coupled with the electrical grid 210. Alternatively, the demand signal 415 may be generated internally to the wind power plant, for example according to predetermined, contracted amounts of power output and/or frequency regulation. The predetermined amounts may be stored in or otherwise accessible by the WPP controller.

Based on the power demand signal 415, the power control module 315 generates and transmits set points 317A, 317B (or other suitable demand signals) to WTG 100C, 100D. Although not shown, the power control module 315 also transmits set points to the WTGs 100A, 100B. The set points represent power production targets for the WTGs that are based on the available wind power. Responsive to the received set points (e.g., 317A, 317B), the WTGs 100A-100D produce power outputs 425A-425D to the electrical grid 210. Based on information provided by a measurement unit 435 coupled with the electrical grid 210, the power control module 315 determines whether boosted power is required to meet the power demand signal 415. In some embodiments, the measurement unit 435 may couple with current and/or voltage sensors connected with the electrical grid 210. In some embodiments, measurement unit 435 additionally or alternatively couples with one or more sensors for measuring wind conditions, such as an anemometer for wind speed. Based on the measured power production and/or a determined value of available power (based on measured wind conditions), the power control module 315 determines that boost power output should be provided by one or more WTGs to meet the power demand 415.

As shown, WTGs 100A, 100B are selected for the boost group 345 and WTGs 100C, 100D are selected for the reference group 350. The selection of WTGs for boost group 345 and/or reference group 350 may be based on relative boost quality values, as discussed above. The power control module 315 transmits a signal 420 to the boost control module 320. In one embodiment, the signal 420 may be a boost power demand signal. In another embodiment, the signal 420 may be an instruction to trigger boost power production according to the determined boost group 435. The boost control module 320 transmits instruction signals 322A, 322B to WTG 100A, 100B to begin producing boost power outputs 430A, 430B to the electrical grid 210. In one embodiment, the instruction signals 322A, 322B represent one-shot boost instructions (i.e., open-loop control). Alternatively, the instruction signals 322A, 322B may represent a boost power reference signal that is updated relatively slowly (compared with changes in the boost response profile of the WTG). Alternatively, the instruction signals 322A, 322B may be substantially continuous boost power reference signals that are not followed or tracked closely by the WTG 100A, 100B.

The boost power outputs 430A, 430B are injected into electrical grid 210. However, as the boost power production is not continuously regulated, the WTGs 100C, 100D of the regulation group 350 are operated responsive to the boost power production in order to augment the boost power and to thereby meet the power demand specified by the power demand signal 415.

In some embodiments, the WTGs 100C, 100D of regulation group 350 are operated in a curtailed state, in which WTGs 100C, 100D each produce a power output that is less than what is available from the wind power. The power control module 315 may cause the WTGs 100C, 100D to enter the curtailed state in response to determining the boost group 345 and regulation group 350. The curtailed power output may correspond to a predetermined amount, for example, 90% of the available power at the WTG. Accordingly, the WTGs 100C, 100D of regulation group 350 each have a 10% margin up to the available power output to augment the boost power production of WTGs 100A, 100B. In some embodiments, the set points 317A, 317B for the WTGs 100C, 100D are set within the margin formed by the curtailment in order to mitigate some of the variations of the boost power production. For example, say the power control module 315 determines, based on information from the measurement unit 435, that the power production for the WPP is not being met, due to variations in the boost power production. The power control module 315 in response alters the set points 317A, 317B for WTGs 100C, 100D of the regulation group 350 to mitigate the difference. In this way, the injection of boost power outputs 430A, 430B using the boost control module 320 forms an outer control loop (outer loop) 410 providing relatively slower control, and the regulation group 350 forms an inner control loop (inner loop) 405 providing relatively faster control, and being responsive to the outer loop 410.

Figure 5:
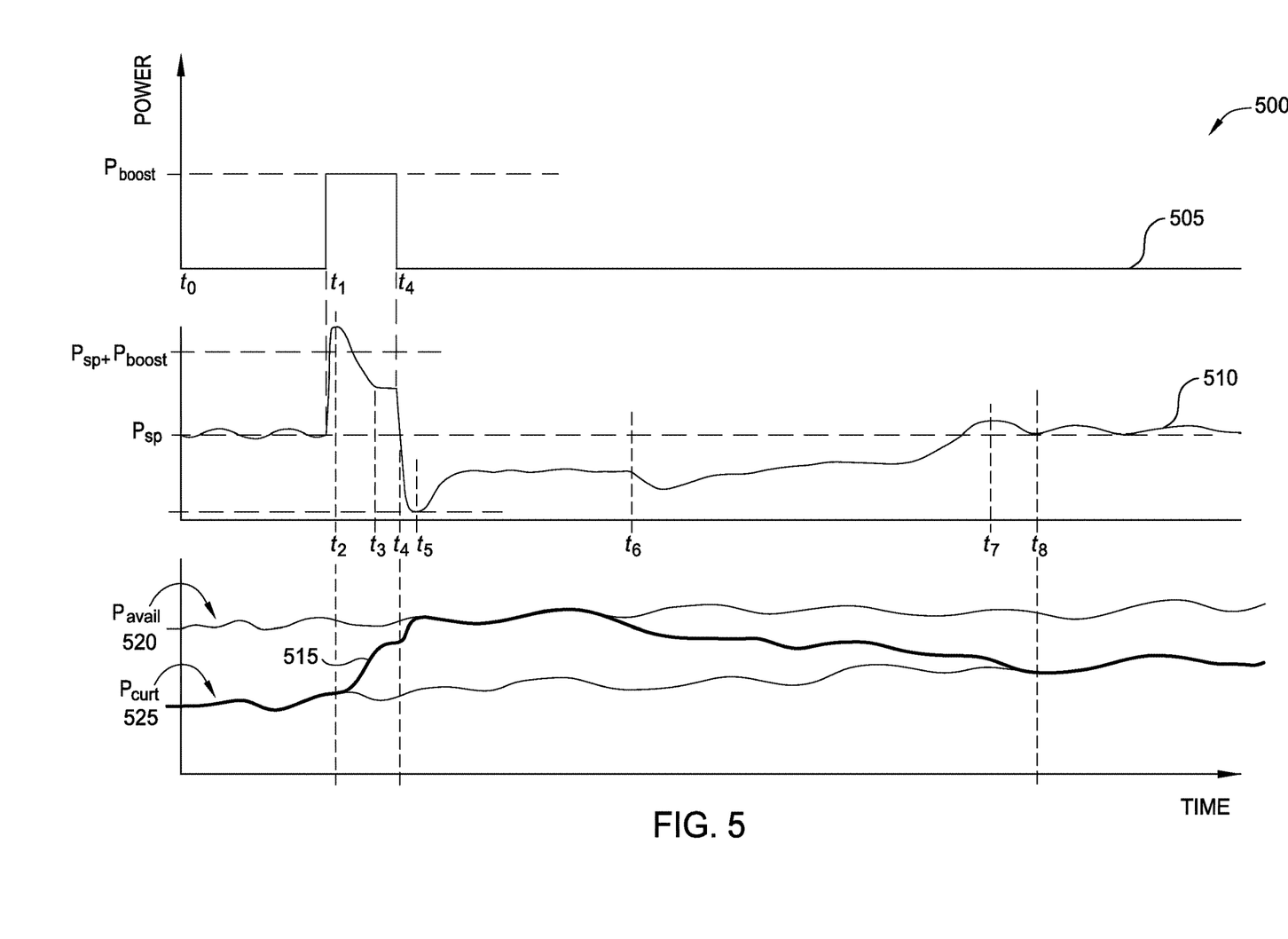
FIG. 5 is a plot illustrating wind power plant control using boost and regulation groups of WTGs, according to one embodiment.

FIG. 5 is a plot illustrating wind power plant control using boost and regulation groups of WTGs, according to one embodiment. Generally, plot 500 represents one possible operation of the control arrangement 300.

A boost power demand signal 505 is depicted, which can be representative of a requested boost power demand corresponding to one or multiple WTGs of the wind power plant. In one example, the boost power demand signal 505 is generated by the WPP controller, and the WPP controller instructs one or more WTGs to begin boosting based on the boost power demand signal 505. In another example, the WPP controller transmits the boost power demand signal 505 to a particular WTG controller. In another example, the boost power demand signal 505 is received by the WPP controller, and the WPP controller instructs one or more WTGs to begin boosting based on the boost power demand signal 505. The power production signal 510 reflects the power production of one or more WTGs included in the boost group. The power production signal 510 is generally responsive to the boost power demand signal 505, which may include one or more intermediate steps, such as a WTG controller receiving an instruction to begin one-shot boosting power production. The power production signal 515 reflects a power output from one or more WTGs in a regulation group. The different signals 505, 510, 515 are not drawn to scale but are to be interpreted in view of the discussion provided herein.

At time $t_0$, the boost power demand signal 505 has a zero value, indicating that no boost power has been requested or required. Between times $t_0$ and $t_1$, the power production signal 510 varies around a power set point value $P_{SP}$, which may reflect relatively minor changes in available power and other operational conditions. The power production signal 515 reflects operation of the regulation group at a curtailed power level (according to curtailed power signal $P_{curt}$ 525), which is some predetermined amount less than the available power in the wind (available power signal $P_{avail}$ 520). For example, the curtailed power signal 525 may represent a fixed amount or percentage less than the available power 520. The curtailed power signal 525 may be determined based on historical boost data. For example, the curtailment for the regulation group need not be as severe for cases where the boost quality of WTGs in the boost group is relatively good (e.g., the change in power production signal 510 appears similar to the boost power demand signal 505). While the WTGs of the regulation group (corresponding to power production signal 515) are depicted as operating with a curtailed power output prior to the boosting event (i.e., between times $t_0$ and $t_1$, in other embodiments the WTGs are operated with a non-curtailed power output prior to the boosting event. For example, in some cases the composition of the regulation group is not determined until the boost power demand signal 505 is received, such that the WTGs to be allocated to the boost group and regulation group would be operated "normally"—with a non-curtailed power output—prior to the boosting event.

At time $t_1$, the boost power demand signal 505 rises to a level $P_{boost}$ reflecting a request for the specified boost power level during the time period $t_1$-$t_4$. The boost power demand signal 505 may be specified in any suitable form, such as units of power (e.g., kilowatts (kW)), a percentage of the WTG rated power, etc. In response, WTGs included in the boost group are instructed to begin producing boost power output. Accordingly, power production signal 510 rises from near set point level $P_{SP}$ at time $t_1$ to approximately a $P_{SP}+P_{boost}$ level at time $t_2$. During its rise, the power production signal 510 may overshoot the desired level (time $t_2$) before decreasing below the desired level (between times $t_2$ and $t_3$). At time $t_3$, the power production signal 510 reaches a plateau at a level less than the $P_{SP}+P_{boost}$ level and remains relatively steady until time $t_4$.

At time $t_4$, the boost power demand signal 505 is reduced to a zero boost level. The decrease in boost demand may reflect an instruction received by the WTGs of the boost group to stop producing boost power (e.g., a command to abort boosting). Alternatively, the WTGs of the boost group may be configured to produce boost power as long as possible, e.g., ceasing boost power production when the rotor speed decreases to a predetermined minimum rotor speed value. The power production signal 510 decreases sharply between times $t_4$ and $t_5$, as the WTGs of the boost group recover from providing the boost power. Generally, during a recovery, some of the power produced by the WTGs from the available wind power is used to increase and restore the kinetic energy of the rotor to a pre-boosting level. After the sharp decrease of power production to time $t_5$, the power production signal 510 may include a slow increase to the power output. During a first portion of the recovery period between times $t_5$ and $t_6$, the rotor speed is stabilized, and during a second portion of the recovery period between times $t_6$ and $t_7$, the rotor speed is returned to a pre-boosting level. The power production signal 510 stabilizes near the original $P_{SP}$ level at approximately time $t_8$.

Ideally, the boost power demand signal 505 would be matched exactly by the boost power curve of signal 510. However, the boost power production provided by a real, operational WTG may vary from the boost power demand signal 505, including periods of overshoot and/or undershoot of the boosting demand level. These effects are especially pronounced for the case of one-shot boosting, which after "firing" the shot is not subsequently closely controlled relative to the boosting demand level.

In some embodiments, the WTGs of the reference group are used to augment the boost power production to more closely meet the boost power demand. The power production signal 515 of the reference group WTGs follows the curtailed power signal $P_{curt}$ 525 and begins gradually rising between times $t_2$ and $t_3$. The rise may result from increased power production set points that are responsive to the decrease of power production signal 510 beneath the $P_{SP}+P_{boost}$ level, and/or based on historical or simulated boost data indicating an expected shape, trend, profile, etc. of the power production signal 510. In some embodiments, the increased power production set points for the regulation group mitigate (or offset) the difference between power production signal 510 and the $P_{SP}+P_{boost}$ level, whether partly or fully.

In some cases, the power production from WTGs of the regulation group may also be used to increase wind power plant output during the recovery periods of the boost group WTGs, mitigating some of the power deficit as those WTGs recover. In some cases, the power production from the regulation group may be used to recover the WTGs of the boost group, resulting in a shorter recovery period.

Figure 6:
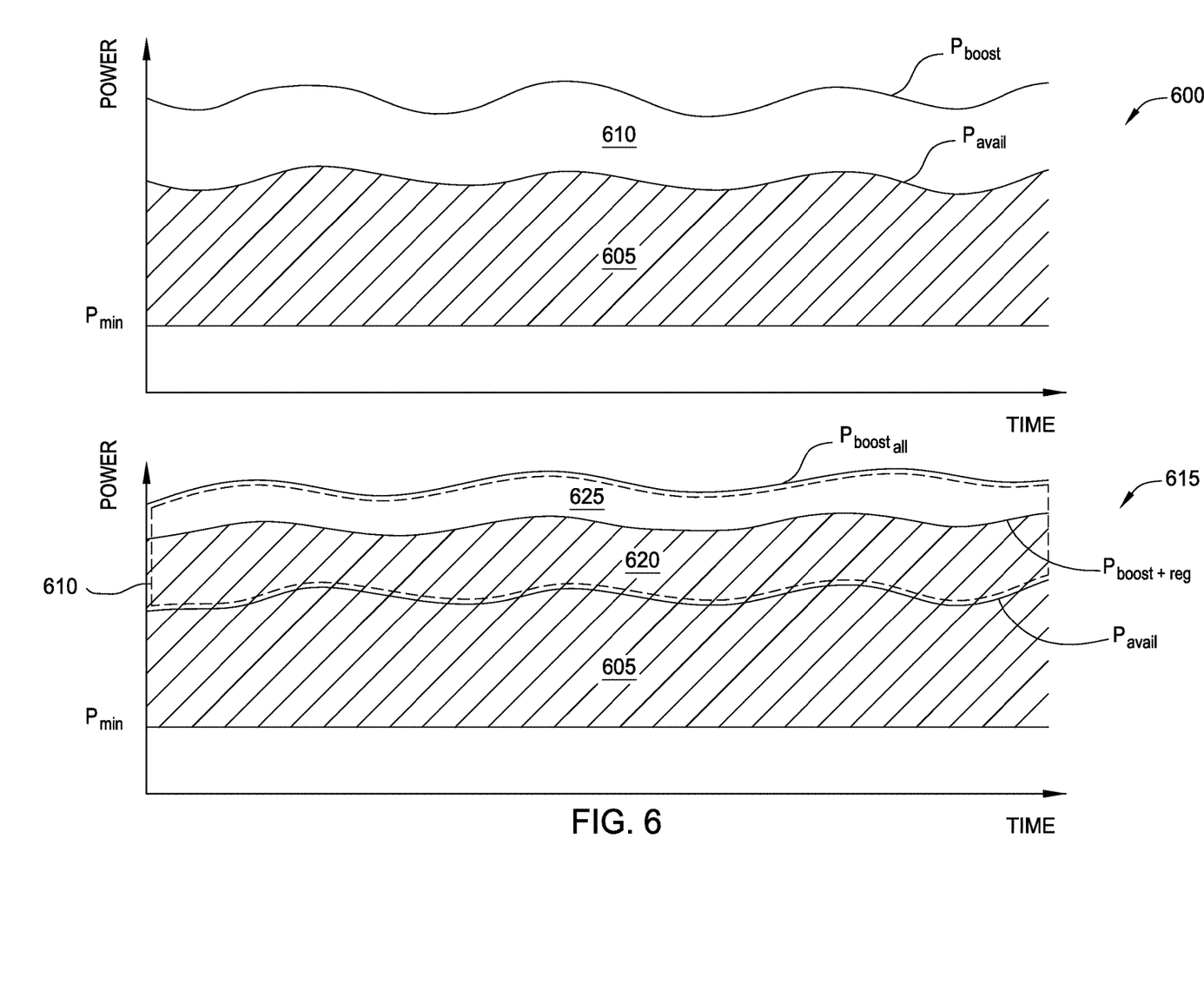
FIG. 6 includes plots illustrating an increased range of dynamic control of the wind power plant using boost and regulation groups of WTGs, according to one embodiment.

FIG. 6 includes plots illustrating an increased range of dynamic control of the wind power plant using boost and regulation groups of WTGs, according to one embodiment.

In plot 600, no regulation group is provided for the wind power plant (i.e., all WTGs in the WPP can be used for boosted power output). The wind power plant controller is thus able to regulate the power output of the WPP from a minimum level (e.g., corresponding to minimum technical output levels of each of WTGs, such as 20% of the rated power output) up to the power available from the wind $P_{avail}$. This dynamic control range is represented by shaded area 605. In the case of one-shot or other types of not-closely regulated boost power production, without a separate regulation group, the WPP is able to produce power up to a $P_{BOOST\_ALL}$ level, but is unable closely regulate the output corresponding to area 610.

In plot 615, one or more WTGs are included in the regulation group and are not available for providing a boosted power output. While each WTG included in the regulation group reduces a maximum amount of production of the wind power plant based on boosting to $P_{BOOST+REG}$, providing one or more WTGs for the regulation group allows for an increased range of dynamic control of the WPP. The area 610, which was unable to be closely regulated in plot 600, is partly overlapped by shaded area 620. Area 620 depicts the additional controllable power range that is enabled by use of the regulation group WTG(s). The unregulated range is correspondingly reduced to a lesser area 625.

Figure 7:
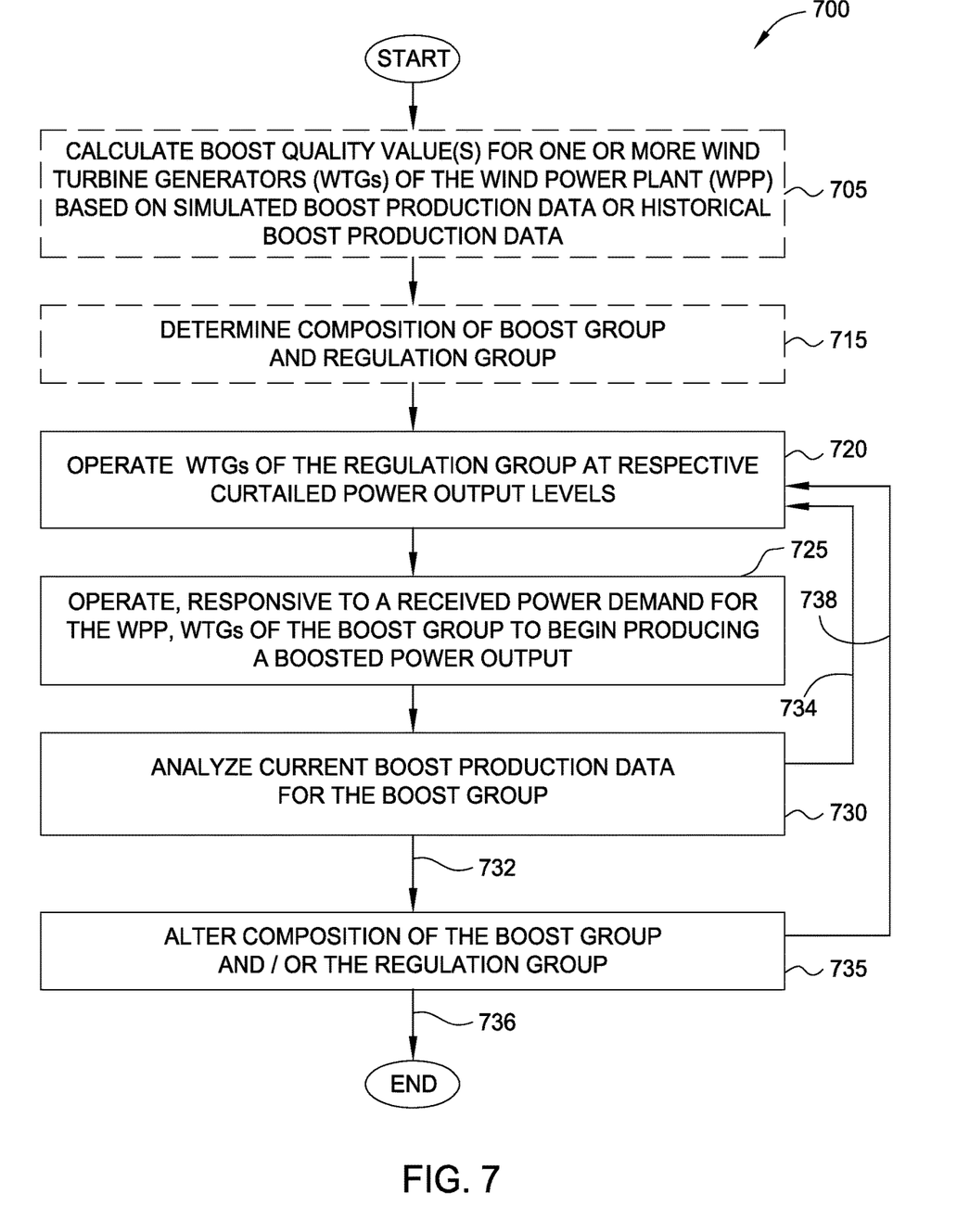
FIG. 7 illustrates a method of controlling a power output of a wind power plant comprising a plurality of wind turbine generators, according to one embodiment.

FIG. 7 illustrates a method of controlling a power output of a wind power plant comprising a plurality of wind turbine generators, according to one embodiment. Method 700 begins at an optional block 705, an assessment module of a control arrangement calculates boost quality value(s) for one or more WTGs based on simulated boost production data or historical boost production data. At optional block 715, a grouping module of the control arrangement determines the composition of the boost group and the regulation group of WTGs. In some alternate embodiments, a default configuration is provided defining the composition of the groups.

At block 720, the WTGs of the regulation group are operated at respective curtailed power output levels. The curtailed power level may be predetermined, such as a particular amount or percentage less than the amount of available power in the wind.

At block 725, the WTGs of the boost group are operated to begin producing a boosted power output. This operation is responsive to a received or generated power demand corresponding to the WPP. The operation may include transmitting an instruction to the WTGs to begin boosted power output, in some cases without providing a specific boost power set point for the WTGs to track.

At block 730, the current boost production data is analyzed for the boost group of WTGs. Alternatively, the set points of the regulation group WTGs or measured power production may be analyzed. The analysis generally determines whether the regulation group provides sufficient regulation to meet the power demand and/or provides excessive regulation. Depending on the result, method 700 may proceed along path 732 to block 735, where the composition of the boost group and/or the regulation group is altered if the regulation is insufficient or excessive. However, if the composition of groups does not need to be altered, method 700 proceeds along path 734 to block 720 to continue operation. Following the completion of block 735, the method may proceed along path 738 and continue operation at block 720, or may proceed along path 736 and end.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method of controlling a power output of a wind power plant (WPP) comprising a plurality of wind turbine generators (WTGs), the method comprising:
    calculating, for each of the plurality of WTGs, a respective boost quality value, wherein the boost quality value indicates a boost capability of the respective WTG;
    determining, based on the calculated boost quality values, a number of the plurality of WTGs to include in a boost group comprising at least one of the plurality of WTGs;
    operating, responsive to a received power demand corresponding to the WPP, the boost group to produce a boosted power output using kinetic energy available in one or more rotors of the plurality of WTGs, wherein the boosted power output exceeds power available to the boost group through the wind; and
    determining, based on a measured amount of the boosted power output, power production set points for a regulation group of one or more different WTGs of the plurality of WTGs to thereby meet the power demand.

2. The method of claim 1, further comprising:
    determining, based on the calculated boost quality values, a number of WTGs to include in the regulation group of WTGs.

3. The method of claim 1, wherein operating the boost group is performed without providing a substantially continuous regulation of boosted power production.

4. The method of claim 1, wherein the calculation of the boost quality values is based on one of simulated boost production data for the corresponding WTG, and historical boost production data for the corresponding WTG.

5. The method of claim 2, further comprising:
    operating each WTG of the regulation group at a respective curtailed power output level,
    wherein, for each WTG of the regulation group, the determined power production set points are between the respective curtailed power output level and the available power of the WTG based on current wind conditions.

6. The method of claim 1, further comprising:
    altering, based on an analysis of boost production data for the boost group, an initial configuration of the boost group and regulation group.

7. The method of any of claim 1, wherein the boosted power output from the boost group is provided through one-shot boosting.

8. The method of any of claim 1, further comprising instructing, based on the power demand, power production, and the boosted power production, the boost group to cease producing the boosted power output.

9. A control arrangement for a wind power plant (WPP) comprising a plurality of wind turbine generators (WTGs), the control arrangement comprising:
   an assessment module configured to calculate, for each WTG of the plurality of WTGs, a respective boost quality value, wherein the boost quality value indicates a boost capability of the respective WTG;
   a grouping module configured to determine, based on the calculated boost quality values, a number of the plurality of WTGs to include in a boost group comprising at least one of the plurality of WTGs;
   a boost dispatcher configured to instruct, responsive to a received power demand corresponding to the WPP, the boost group to produce a boosted power output using kinetic energy available in one or more rotors of the plurality of WTGs, wherein the boosted power output exceeds power available to the boost group through the wind, and wherein the boosted power output of each of the one or more WTGs of the boost group is regulated independent of the power demand; and
   a power control module configured to generate, based on a measured amount of boosted power output, power production set points for a regulation group of one or more different WTGs of the plurality of WTGs to thereby meet the power demand.

10. The control arrangement of claim 9,
    wherein the grouping module is further configured to determine, based on the calculated boost quality values, a number of WTGs to include in the regulation group.

11. The control arrangement of claim 9, wherein operating the boost group is performed without providing a substantially continuous regulation of boosted power production.

12. The control arrangement of claim 9, wherein the calculation of the boost quality values is based on one of simulated boost production data for the corresponding WTG, and historical boost production data for the corresponding WTG.

13. The control arrangement of claim 9, wherein the power control module is further configured to:
    operate each WTG of the regulation group at a respective curtailed power output level,
    wherein, for each WTG of the regulation group, the generated power production set points are between the respective curtailed power output level and the available power of the WTG based on current wind conditions.

14. The control arrangement of claim 9, wherein the grouping module is further configured to:
    alter, based on an analysis of boost production data for the boost group, an initial configuration of the boost group and regulation group.

15. The control arrangement of claim 9, wherein the boosted power output from the boost group is provided through one-shot boosting.

16. The control arrangement of claim 9, further comprising instructing, based on the power demand, power production, and the boosted power production, the boost group to cease producing the boosted power output.

17. A wind power plant (WPP) comprising:
    a plurality of wind turbine generators (WTGs); and
    a control arrangement comprising:
        an assessment module configured to calculate, for each WTG of the plurality of WTGs, a respective boost quality value, wherein the boost quality value indicates a boost capability of the respective WTG;
        a grouping module configured to determine, based on the calculated boost quality values, a number of the plurality of WTGs to include in a boost group comprising at least one of the plurality of WTGs;
        a boost dispatcher module configured to instruct, responsive to a received power demand corresponding to the WPP, the boost group to produce a boosted power output using kinetic energy available in one or more rotors of the plurality of WTGs, wherein the boosted power output exceeds power available to the boost group through the wind, and wherein the boosted power output of each of the one or more WTGs of the boost group is regulated independent of the power demand; and
        a power control module configured to generate, based on a measured amount of boosted power output production, power production set points for a regulation group of one or more different WTGs of the plurality of WTGs to thereby meet the power demand.

18. The wind power plant of claim 17,
    wherein the grouping module is further configured to determine, based on the calculated boost quality values, a number of WTGs to include in the regulation group.

19. The wind power plant of claim 17, wherein the calculation of the boost quality values is based on one of simulated boost production data for the corresponding WTG, and historical boost production data for the corresponding WTG.

20. The wind power plant of claim 17, wherein the power control module is further configured to:
    operate each WTG of the regulation group at a respective curtailed power output level,
    wherein, for each WTG of the regulation group, the generated power production set points are between the respective curtailed power output level and the available power of the WTG based on current wind conditions.

21. The wind power plant of claim 17, wherein the grouping module is further configured to:
    alter, based on an analysis of boost production data for the boost group, an initial configuration of the boost group and regulation group.

22. The method of claim 1, wherein the calculation of the boost quality value is based on a boost power references signal, and at least one of: an amplitude of overshoot or undershoot in response to the boost power reference signal level, and a difference signal based on a comparison with the boost power reference signal.

23. The control arrangement of claim 9, wherein the calculation of the boost quality value is based on a boost power references signal, and at least one of: an amplitude of overshoot or undershoot in response to the boost power reference signal level, and a difference signal based on a comparison with the boost power reference signal.

24. The wind power plant of claim 17, wherein the calculation of the boost quality value is based on a boost power references signal, and at least one of: an amplitude of overshoot or undershoot in response to the boost power reference signal level, and a difference signal based on a comparison with the boost power reference signal.

* * * * *